United States Patent
Zhu et al.

(10) Patent No.: US 9,936,451 B2
(45) Date of Patent: Apr. 3, 2018

(54) COMMUNICATION SYSTEM FOR SENSOR NETWORKS

(71) Applicant: Samsung Electronics Co., Ltd., Suwon-si, Gyeonggi-do (KR)

(72) Inventors: Chunhui Zhu, San Jose, CA (US); Youngsoo Kim, Seoul (KR); Chiu Ngo, Millbrae, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 285 days.

(21) Appl. No.: 14/743,568

(22) Filed: Jun. 18, 2015

(65) Prior Publication Data

US 2016/0374016 A1 Dec. 22, 2016

(51) Int. Cl.
*H04W 52/02* (2009.01)
*H04W 84/18* (2009.01)

(52) U.S. Cl.
CPC ... *H04W 52/0209* (2013.01); *H04W 52/0274* (2013.01); *H04W 84/18* (2013.01)

(58) Field of Classification Search
CPC ......... H04W 52/0209; H04W 52/0216; H04W 52/0222; H04W 84/18
See application file for complete search history.

(56) References Cited

U.S. PATENT DOCUMENTS

| | | |
|---|---|---|
| 8,127,158 B2 | 2/2012 | Jessup et al. |
| 8,629,386 B2 | 1/2014 | Bermak et al. |
| 8,788,103 B2 | 7/2014 | Warren et al. |
| 2007/0214374 A1 | 9/2007 | Hempstead et al. |
| 2009/0316624 A1 | 12/2009 | Van Der Wateren |
| 2010/0097969 A1* | 4/2010 | De Kimpe ........ H04W 52/0216 370/311 |
| 2011/0213278 A1 | 9/2011 | Horak et al. |
| 2012/0119902 A1 | 5/2012 | Patro et al. |
| 2012/0163263 A1* | 6/2012 | Oh .................... H04W 52/0216 370/311 |
| 2012/0226472 A1 | 9/2012 | Yuen et al. |
| 2013/0234536 A1 | 9/2013 | Chemishkian et al. |

(Continued)

FOREIGN PATENT DOCUMENTS

| | | |
|---|---|---|
| EP | 2426865 | 3/2012 |
| WO | WO 2008/002783 | 1/2008 |

OTHER PUBLICATIONS

Misic et al., "Sensing with One or with Four? A comparison of Two IEEE 802.15.x Protocols for Use in Sensor Networks", International Journal of Distributed Sensor Networks, Feb. 14, 2007.

*Primary Examiner* — Omer S Mian
(74) *Attorney, Agent, or Firm* — Beyer Law Group LLP

(57) ABSTRACT

In one aspect of the present invention, a method for managing communications in a sensor network will be described. A coordinator device receives charging interval data from an energy harvesting sensor device. A sleeping interval for the sensor device is determined. A beacon frame is transmitted from the coordinator device to one more sensor devices in a network. The timing of the transmission is based at least in part on the sleeping interval data. The beacon frame may contain requests, commands or other data designated specifically for the sensor device. Various other aspects of the invention relate to the sensor device, the coordinator device and/or their operations.

21 Claims, 9 Drawing Sheets

(56) References Cited

U.S. PATENT DOCUMENTS

| | | |
|---|---|---|
| 2014/0062669 A1 | 3/2014 | Mena et al. |
| 2014/0122958 A1 | 5/2014 | Greenebrg et al. |
| 2015/0319803 A1* | 11/2015 | Hosny .................... G01R 21/00 |
| | | 702/60 |
| 2016/0112280 A1* | 4/2016 | Yamauchi ............. H04L 41/085 |
| | | 709/223 |
| 2016/0212703 A1* | 7/2016 | Seok ................. H04W 52/0225 |

* cited by examiner

FIG. 7

| Octets: 2 | 1 | 4/10 | 0/5/6/10/14 | 2 | variable | variable | variable | 2 |
|---|---|---|---|---|---|---|---|---|
| Frame Control | Sequence Number | Addressing fields | Auxiliary Security Header | Superframe Specification | GTS Fields | Pending Address Fields | Beacon Payload | FCS |
| MHR | | | | MAC Payload | | | | MFR |

FIG. 8

| Octets: 2 | 1 | variable | 0/5/6/10/14 | 1 | variable | 2 |
|---|---|---|---|---|---|---|
| Frame Control | Sequence Number | Addressing Fields | Auxiliary Security Header | Command Frame Identifier | Command Payload | FCS |
| MHR | | | | MAC Payload | | MFR |

FIG. 9

| Octets: variable | Octets: 1 | Octets: 1 | Octets: 2 |
|---|---|---|---|
| MHR Fields | Command Frame Identifier | Beacon Multiplication Coefficient | FCS |
| | MAC Payload | | MFR |

COMMUNICATION SYSTEM FOR SENSOR NETWORKS

FIELD OF THE INVENTION

The present invention relates generally to sensor network technologies. Various implementations of the invention relate to communication protocols, devices and systems used in networks with energy harvesting sensors.

BACKGROUND

Wireless sensor networks are used to monitor changes in conditions across an area of interest. Some example applications include medical sensors that are implanted in different parts of the body, security sensors that can detect intrusions at a residence and environmental sensors that measure temperature or the presence of particular gases in an industrial plant.

Generally, a wireless sensor network includes multiple individual sensor nodes that are distributed across an area of interest. Each node includes a sensor that monitors changes in temperature, pressure or other characteristics in the ambient environment. Each node includes a transmitter, which enables it to communicate the sensor data to a coordinator device. The sensor data may be obtained at the coordinator device and used to analyze the environment and make adjustments as appropriate.

In many current sensor networks, each sensor node is powered by a battery. There has been growing interest in the use of energy harvesting sensor devices. An energy harvesting sensor device is a sensor node that uses the ambient environment (e.g., pressure, vibration, light, etc.) to provide the necessary power to support the communication and monitoring operations of the device.

SUMMARY

In one aspect of the present invention, a method for managing communications in a sensor network will be described. A coordinator device receives charging interval data from an energy harvesting sensor device. In various embodiments, there are multiple energy harvesting sensor devices that are connected with the coordinator device using a wireless network. A sleeping interval for the sensor device is determined. A beacon frame is transmitted from the coordinator device to one or more sensor devices in a network. The timing of the transmission is based at least in part on the sleeping interval. The beacon frame may contain requests, commands or other data designated specifically for the sensor device. Various embodiments relate to a coordinator device that performs the above operations, as well as other operations, arrangements and devices used in a sensor network.

In another aspect, a sensor device will be described. The sensor device includes an energy harvesting module, a power source that is charged using the energy harvesting module, a network interface unit, a processor unit and a storage unit. The network interface unit is arranged to connect the sensor device through a network with a coordinator device. The memory unit stores computer readable instructions, which when executed by the processor unit causes the sensor device to perform various operations. These operations include determining charging interval data at the sensor device. The charging interval data is transmitted to the coordinator device. A beacon frame is received from the coordinator device. The beacon frame includes data to be used by the sensor device and is received at a time based on the transmitted charging interval data. One or more operations are performed based on the sensor device data in the beacon frame.

BRIEF DESCRIPTION OF THE DRAWINGS

The invention and the advantages thereof, may best be understood by reference to the following description taken in conjunction with the accompanying drawings in which:

FIG. 7 is a diagram of a beacon frame according to a particular embodiment of the present invention.

FIG. 8 is a diagram of a command frame according to a particular embodiment of the present invention.

FIG. 9 is a diagram of a beacon update frame according to a particular embodiment of the present invention.

In the drawings, like reference numerals are sometimes used to designate like structural elements. It should also be appreciated that the depictions in the figures are diagrammatic and not to scale.

DETAILED DESCRIPTION

Figure 1:
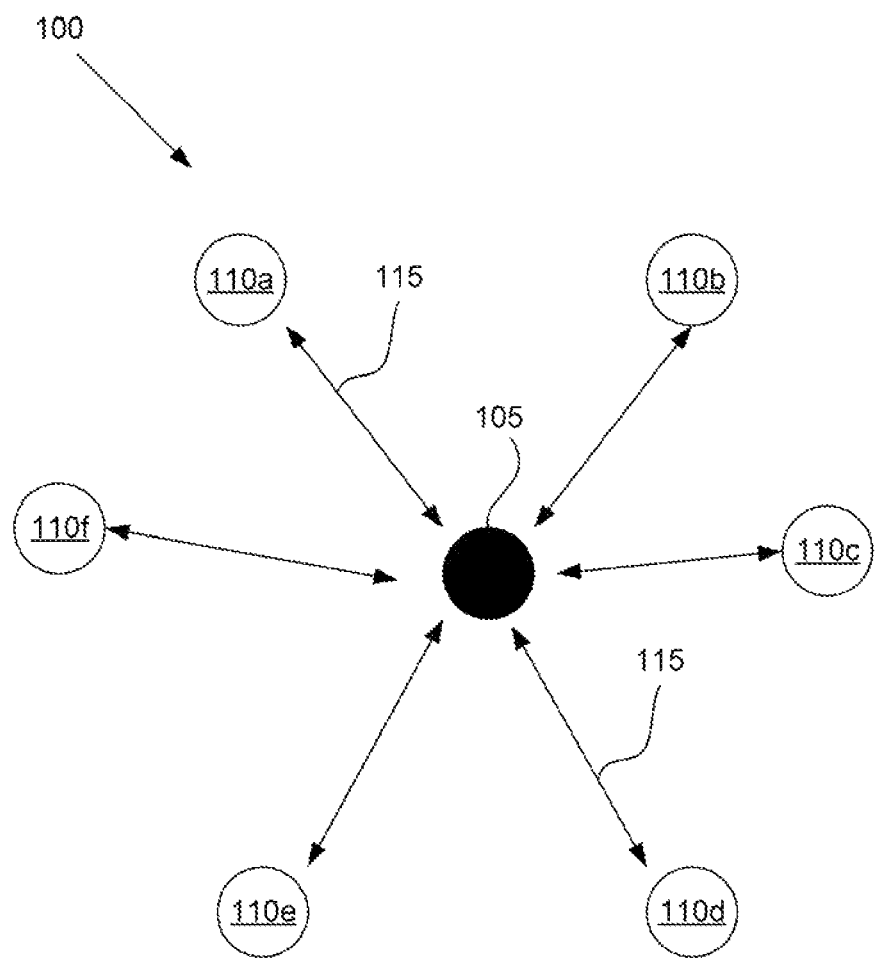
FIG. 1 is a diagram of a sensor system according to a particular embodiment of the present invention.

The present invention relates to methods, devices, systems and arrangements for managing communications in a sensor network. Various implementations relate to a sensor network with energy harvesting sensor devices.

As noted in the Background, many sensor networks in use today include sensor devices that are powered by batteries. The use of a battery allows the sensor device to perform operations and maintain communication links with other devices in the network for a sustained period of time. However, at some point, batteries must be replaced, which can be an expensive and burdensome process.

As a result, there have been efforts to develop energy harvesting sensor devices. Such devices include an energy harvesting mechanism or module that is able to provide power to the sensor device by obtaining it from the ambient environment. A simple example of this is a sensor device that includes a solar panel, which can generate electricity using sunlight. Other systems may generate energy using vibration, pressure, heat, radio frequency signals or other sources. The use of an energy harvesting mechanism eliminates or reduces the need to replace a power source for the sensor device and allows the sensor device to be deployed in the field indefinitely.

One challenge, however, with energy harvesting sensor devices is that their power generation tends to be intermittent. For example, a sensor device that is powered through the use of a solar panel generates less electricity at night time or in cloudy conditions than when the sun is shining brightly. Depending on the environmental conditions, an energy harvesting device may require different amounts of time to charge such that it is capable of communication and monitoring operations.

This can create problems for network communications. For example, one protocol for communications in a wireless sensor network is the IEEE 802.15.4 standard. In IEEE 802.15.4, a coordinator device synchronizes the transmission of data from multiple sensor devices. More specifically, the coordinator device transmits out a beacon frame at consistent intervals. The coordinator device may put data in the beacon for use and processing by a particular sensor device. The beacon may also indicate a particular time slot during which the sensor device can transmit data to the coordinator device without causing congestion in the communication channel. In a conventional wireless sensor network in which all of the sensor devices are battery-powered, each sensor device is always in a position to receive every beacon frame and to obtain any data designated for it by the coordinator device. Put another way, the coordinator device does not tailor the sending of particular beacon frames to individual sensor devices. It is expected that every sensor device can receive and process every transmitted beacon frame.

That may not be the case, however, if the sensor network includes multiple energy harvesting sensor devices. Each energy harvesting sensor device may require different amounts of time to charge and may be "asleep" at different times. Thus, the coordinator device cannot expect that every sensor device will receive and be able to process every beacon. Put another way, the coordinator device may end up placing data for a particular sensor device in a beacon and transmitting the beacon to the sensor device, only to find that the sensor device is charging, asleep and/or otherwise incapable of receiving and processing the data. The data may then have to be sent multiple times, which increases traffic and power consumption.

Various embodiments of the present invention are arranged to address one or more of the above issues. More specifically, some embodiments relate to a sensor system with multiple energy harvesting sensor devices that are connected with a coordinator device through a network. The system takes into account the individual, different charging intervals for the sensor devices. Thus, data designated for a particular sensor device is transmitted to that sensor device when it is operational, and not when it is asleep and/or charging. The transmission timing schedule may be different for each sensor device. The sensor system may be operated using a variety of techniques, some of which are described below.

Referring initially to FIG. 1, an example sensor system 100 according to a particular embodiment of the present invention will be described. The system 100 includes a coordinator device 105 and multiple energy harvesting sensor devices 110a-110f. The devices 105 and 110a-110f communicate using the network 115.

The sensor devices 110a-110f and the coordinator device 105 may use any suitable protocol or network to communicate with one another. In some embodiments, for example, the devices communicate using Bluetooth, WiFi, the IEEE 802.15.4 standard, the IEEE 802.11 standard, a cell phone network, etc. Generally, the devices are connected using a wireless network, although the network 115 may be (partially) wired as well. In the illustrated embodiment, the devices are arranged in a star topology, although any suitable arrangement or topology (e.g., a peer-to-peer topology) may also be used.

Generally, the coordinator device 105 is any suitable device arranged to help synchronize communications in the network 115. In various embodiments, for example, the coordinator device 105 transmits beacon frames to the sensor devices 110a-110f. The beacon frames may contain data that is designated for a particular sensor device. As will be discussed in greater detail later in the application, the coordinator device takes into account the charging intervals of the sensor device to help ensure that when the data is sent, it is actually received by the designated sensor device. That is, the data is not sent until the designated sensor device is sufficiently charged and has sufficient power to receive the data and/or act upon the data.

Each sensor device 110a-110f includes an energy harvesting module or mechanism. That is, each sensor device is capable of obtaining power from its ambient environment. Any suitable energy harvesting mechanism may be used, including but not limited to solar panels/modules and mechanical systems used to generate power from vibration, pressure and/or heat. In some implementations, the sensor device is arranged to receive radio frequency signals, which are converted into energy. The harvested energy is used to charge a power source (e.g., a battery or capacitor) in the sensor device. Once the power source is sufficiently charged, the sensor device is then in an operational state and is capable of receiving data from other devices in the network 115 and/or performing one or more operations in response to the received data.

In the illustrated embodiment, each sensor device 110a-110f primarily or only obtains power through energy harvesting, although this not a requirement. In various implementations, for example, the system 100 also includes one or more sensor devices that are powered by conventional batteries and/or that lack an energy harvesting capability. The coordinator device 105 may be powered by an energy harvesting mechanism, a conventional battery and/or an external, connected power source.

Figure 2:
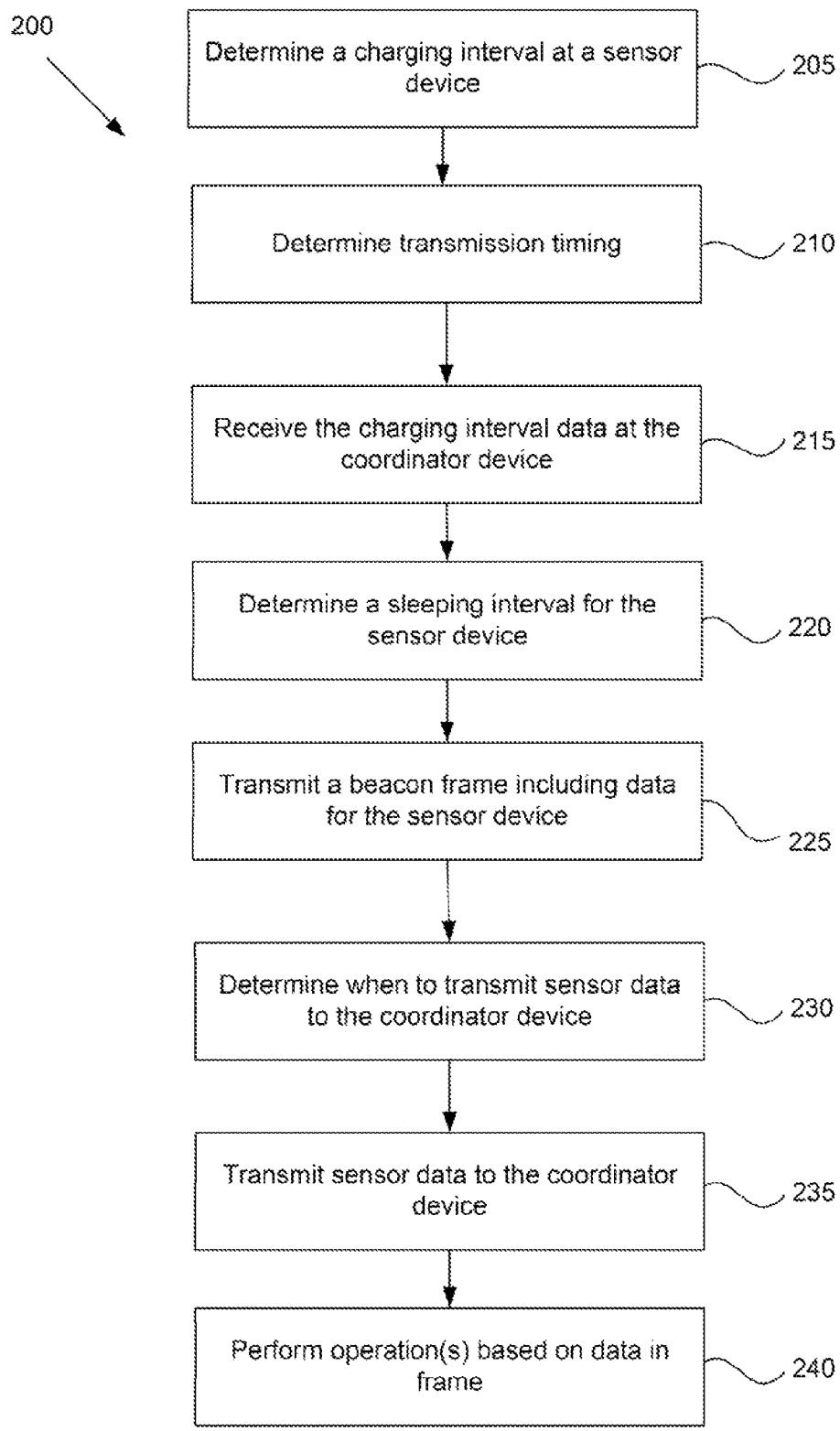
FIG. 2 is a flow chart illustrating an example method for managing communications in the sensor network of FIG. 1.

Referring next to FIG. 2, an example method for managing communications for the sensor system illustrated in FIG. 1 will be described. Initially, at step 205, a sensor device 110a determines a charging interval.

The charging interval is a period of time that the sensor device 110a needs to charge its power source to a particular energy level (E). E may be set at any suitable level, which may differ for various applications. In some embodiments, for example, E is the energy level required for the sensor device 110a to perform one or more specific operations e.g., transmit at least X data frame(s) and/or receive and process at least Y data frame(s) (X and Y each being any predetermined number or integer), after which recharging is required to perform the same operations. Depending on E and the contemplated operations, the duration of the charging interval may vary widely.

Figure 4:
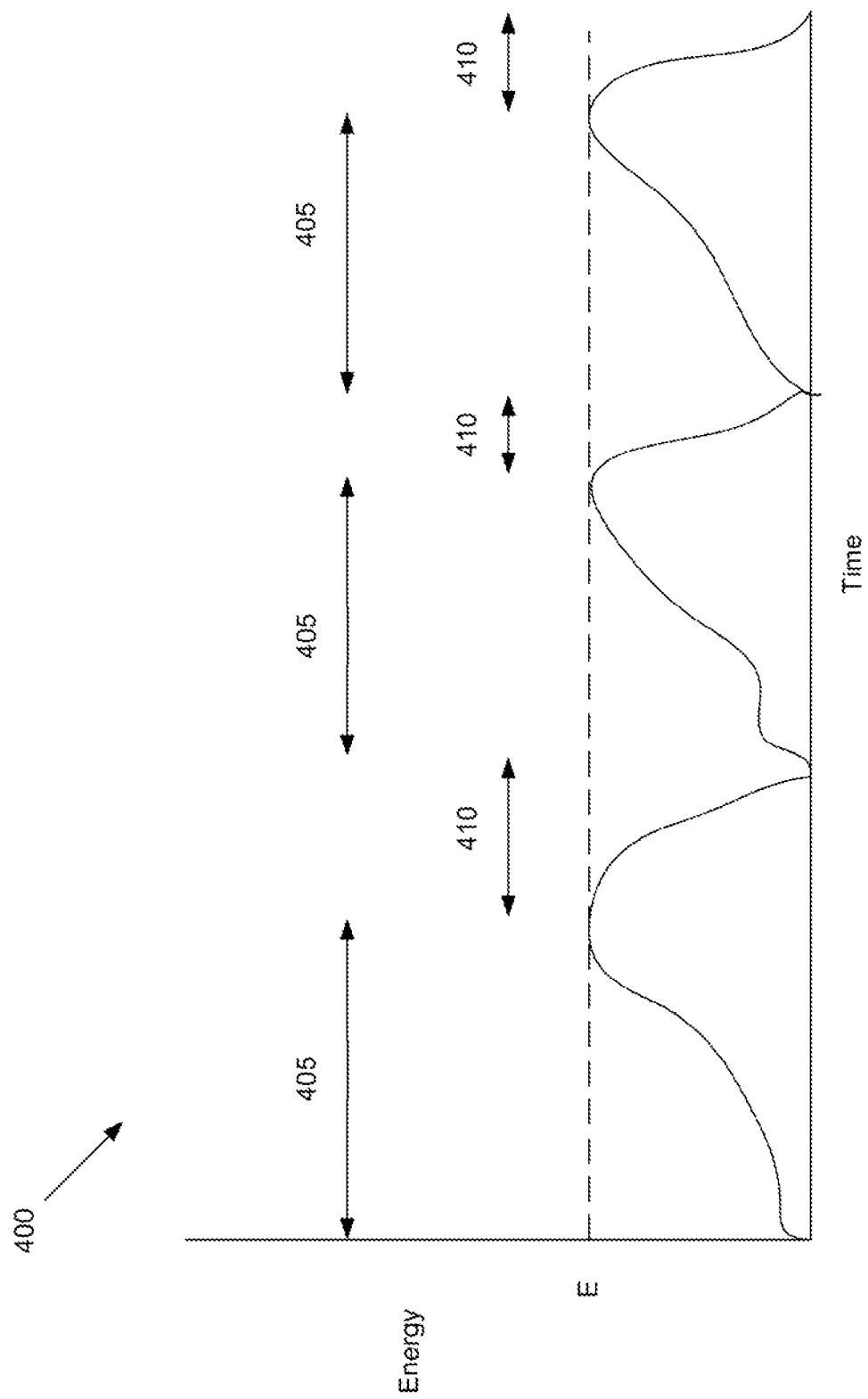
FIG. 4 is a graph illustrating charging intervals according to a particular embodiment of the present invention.

FIG. 4 is a graph 400 of example charging intervals for a sensor device 110a. The horizontal axis for the graph represents time and the vertical axis represents an energy level reached by a power source in the sensor device 110a. The sensor device 110a shifts between charging intervals 405 and operational states 410. That is, during a charging cycle/interval 405, the sensor device 110a collects energy from its ambient environment (e.g., using solar energy, vibration, pressure, etc.) to charge its power source. Thus, during the charging interval 405, the energy level rises until it reaches an energy level E.

Generally, while in a charging interval 405, the sensor device 110a is not fully functional. That is, at least one or more of its functions or capabilities may be deactivated and/or the sensor device may be in a sleep mode due to its low energy level. The capabilities of the sensor device during this phase may vary, depending on the needs of a particular application. In some embodiments, for example, the sensor device 110a is not capable of receiving, processing and/or transmitting data frames. Alternatively or additionally, the sensor device 110a may be incapable of performing particular commands sent to it by the coordinator device 105, which otherwise could be performed after the power source of the sensor device 110a has been sufficiently charged (e.g., reached E or when it is in the operational state 410.) In still other embodiments, the sensor device 110a, even during a charging interval 405, may be capable of receiving command frames and may transmit data or perform operations when specifically instructed to do so by the coordinator device 105. In some implementations, for example, even during a charging interval 405, the sensor device 110a is arranged to perform operations in response to a special frame/command received from the coordinator device 105 that is designated as high priority, but otherwise is non-responsive to other types of frames/commands received from the coordinator device 105 that are not specially designated in this manner.

Once the charging achieves the energy level E, the sensor device 110a shifts to an operational state 410. In other words, the sensor device 110a is now capable of particular operations that it could not perform while charging, possibly because it lacked sufficient energy to do so. Such operations include but are not limited to receiving and processing frames and transmitting frames (e.g., sensor data) to the coordinator device 105 or other devices in the sensor system 100. These operations drain energy from the power source of the sensor device 110a. In the illustrated embodiment, once enough energy is drained from the power source and/or the operations are completed, the charging cycle begins once again and the above process is repeated.

Returning to FIG. 2, based on one or more of the charging intervals 405, the sensor device 110a optionally determines transmission timing data i.e., data indicating a time when a transmission from the coordinator device 105 can be received and processed at the sensor device 110a (step 210). This timing transmission data may take a variety of forms, depending on the needs of a particular application and the protocols that are used in the sensor system 100. In some embodiments, for example, the timing transmission data is expressed in terms of beacon frames e.g., using beacon sequence numbers, a Base Beacon Interval, an Extended Beacon Interval, and/or a Beacon Multiplication Coefficient, which will be described in more detail below.

To help clarify some of the embodiments described herein, an example implementation of a communications system involving beacon frames will be described below, although it should be appreciated that this implementation may be modified as appropriate for different communications applications. In this example implementation, beacon frames are data frames that are transmitted at consistent intervals by the coordinator device 105 to all connected sensor devices 110a-110f in the sensor network 115. Examples of such beacon frames include but are not limited to the beacon frames transmitted in accordance with the IEEE 802.15.4 standard. (An example of such a beacon frame is illustrated in FIG. 7.)

Figure 5:
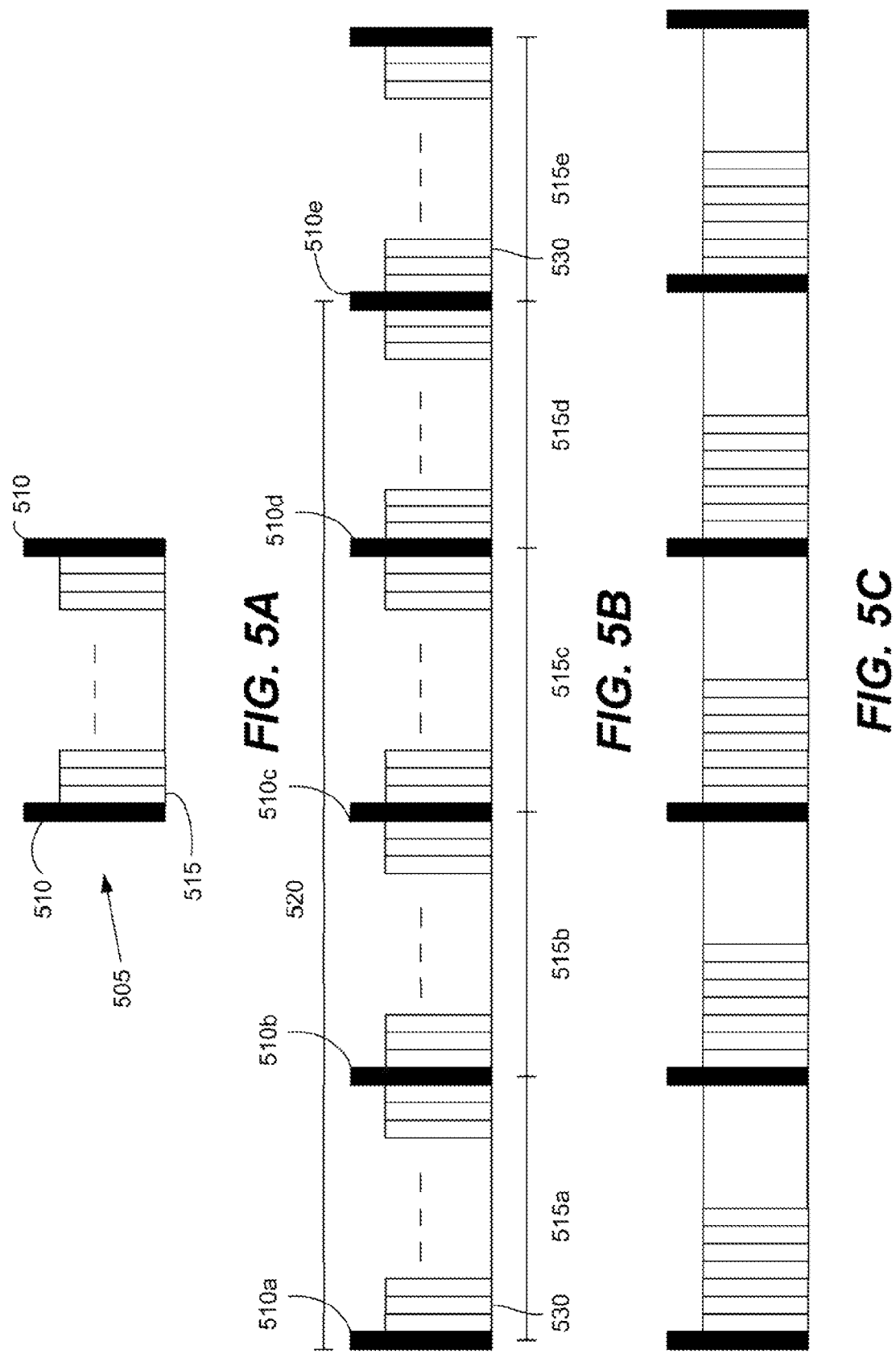
FIGS. 5A-5C is a diagram illustrating Base Beacon Intervals and Extended Beacon Intervals according to a particular embodiment of the present invention.

One approach is illustrated in FIG. 5A. FIG. 5A illustrates a Base Beacon Interval (BBI) 505. In various embodiments, the BBI 505 includes any feature of the BBI used in the IEEE 802.15.4 standard. The horizontal axis represents time. The Base Beacon Interval represents a period of time bordered by transmissions of successive beacon frames 510. (This interval is sometimes referred to as a superframe.) Between the illustrated beacon frames 510 are time slots 515. The number of time slots may vary e.g., in various implementations involving the IEEE 802.15.4 standard, there are sixteen time slots in an active part of the superframe.

The coordinator device 105 may insert a variety of types of data in a particular beacon frame 510. By way of example, the coordinator device 105 may insert data in a beacon frame that indicates when (e.g., by specifying a particular time slot 515) the receiving sensor device 110a should transmit sensor data or other types of data. Additionally, the beacon frame 510 may contain commands from the coordinator device 505 that are intended for use by only one or more specific sensor devices and not any other connected sensor devices. This type of data, which is designated for a particular sensor device, is referred to hereinafter as sensor device data.

Consider an example in which the sensor system 100 includes multiple temperature sensor devices that sense temperature in various locations in a supermarket. One particular sensor device 110a may determine that the temperature in a refrigeration unit has gotten too high. As a result, the coordinator device 105 transmits a beacon frame 510 to that sensor device 110a. The beacon frame 510 contains sensor device data indicating that the sensor device 110a should decrease the temperature at the refrigeration unit and/or increase the amount of refrigeration. Although other sensor devices 110b-110f receive the same beacon frame 510, they do not act on the included data since it is not addressed to them and/or involve commands that cannot or should not be performed by them.

When data in a beacon frame 510 is intended only for a particular sensor device 110a as described above, it is important that the beacon frame 510 with such data be transmitted to the sensor device 110a only at a suitable time. That is, the coordinator device 105, which periodically transmits beacon frames to some or all of the sensor devices, should place data intended for a particular sensor device 110a only in a beacon frame 510 that the sensor device 110a in question will reliably receive and be able to process. As previously discussed, if the beacon frame 510 arrives at the sensor device 110a at a time when the sensor device 110a is asleep, in low power mode and/or charging (e.g., during the charging interval 410 of FIG. 4), then the sensor device 110a may not receive, process and act upon the beacon frame. This may require the coordinator device 105 to resend the data, which slows down the operations of the sensor system 100 and increases power consumption at the coordinator device 105.

In some applications, the sensor device 110a determines an Extended Beacon Interval (EBI) 520 and/or a Beacon Multiplication Coefficient (BMC) to help indicate when sensor device data should be transmitted to the sensor device. An example implementation of the Extended Beacon Interval 520 is illustrated in FIGS. 5A and 5B. As previously discussed, FIG. 5A represents a Base Beacon Interval (BBI) 505. FIG. 5B is a diagram of an example Extended Beacon Interval (EBI) 520, which in the illustrated embodiment includes four BBI 515a-515d. Of course, the number of BBI in any EBI may be any number or integer and may vary widely. The Extended Beacon Interval 520 represents an approximation, in terms of BBI, of the duration of a charging interval for a particular sensor device. That is, in this example, during that interval the sensor device is not in a position to transmit data and/or receive and process sensor device data that is intended for it.

Another way to express this concept is in terms of a Beacon Multiple Coefficient. The Beacon Multiple Coefficient (BMC) represents the EBI or a charging interval duration in terms of an integer multiple of the BBI. Thus, the extended Beacon Multiplication Coefficient can be calculated as follows:

$$BMC = \text{int}\left(\frac{\text{average duration of } X \text{ charging intervals}}{\text{duration of } BBI}\right)$$

where X is any predefined number or integer

Thus, by way of example, if the average duration of the past X charging intervals is between 3 and 4 BBI, then the BMC=4. (It should be appreciated the above formula is intended to be exemplary and may be modified for different applications as appropriate. For example, in some embodiments, the numerator, rather than involving an average duration of multiple X intervals, is the duration of the most recent charging interval.)

Returning to FIG. 2, after the charging interval and transmission timing are determined (steps 205 and 210), the sensor device 110*a* transmits charging interval data, which is received at the coordinator device (step 215). The charging interval data is any data that relates to, is based on or helps indicate the charging interval (e.g., any data described in connection with steps 205 and 210). The charging interval data may also include any transmission timing data (e.g, as described in step 210), including but not limited to the Extended Beacon Interval 520 and/or the Beacon Multiple Coefficient. In various embodiments, the sensor device 110*a* may also transmit other data that helps identify or locate the sensor device e.g., a sensor device ID, an address for the sensor device in the network 115, etc.

The charging interval data may be transmitted using any suitable data structure, data frame and/or communications protocol. Some implementations contemplate, for example, using a general MAC command frame e.g., for use in a network using the IEEE 802.14.5 standard. An example of such a frame is illustrated in FIG. 8. The frame illustrated in FIG. 8 may be modified to include a Beacon Multiplication Coefficient, as shown in the frame illustrated in FIG. 9. Other data (e.g., the address for the sensor device, the ID for the sensor device) may be included in the Command Frame Identifier field or any other suitable field in the frame.

After the coordinator device 105 receives the charging interval data from the sensor device 110*a* (step 215), the coordinator device 105 determines a sleeping interval for the sensor device (step 220). A sleeping interval is any data that helps indicate or is based on a period of time when the sensor device is not fully functional e.g., when the sensor device requires further charging to reach energy level E (e.g., as seen in FIG. 4) and/or cannot perform desired functions due to a lack of energy. The sleeping interval is determined based on the charging interval data received from the sensor device 110*a*, and may take into account a variety of other parameters as well. Generally, the coordinator device 105 does not send particular commands, data or frames to the sensor device during such periods, as otherwise the transmitted data may be ignored or lost.

Figure 6:
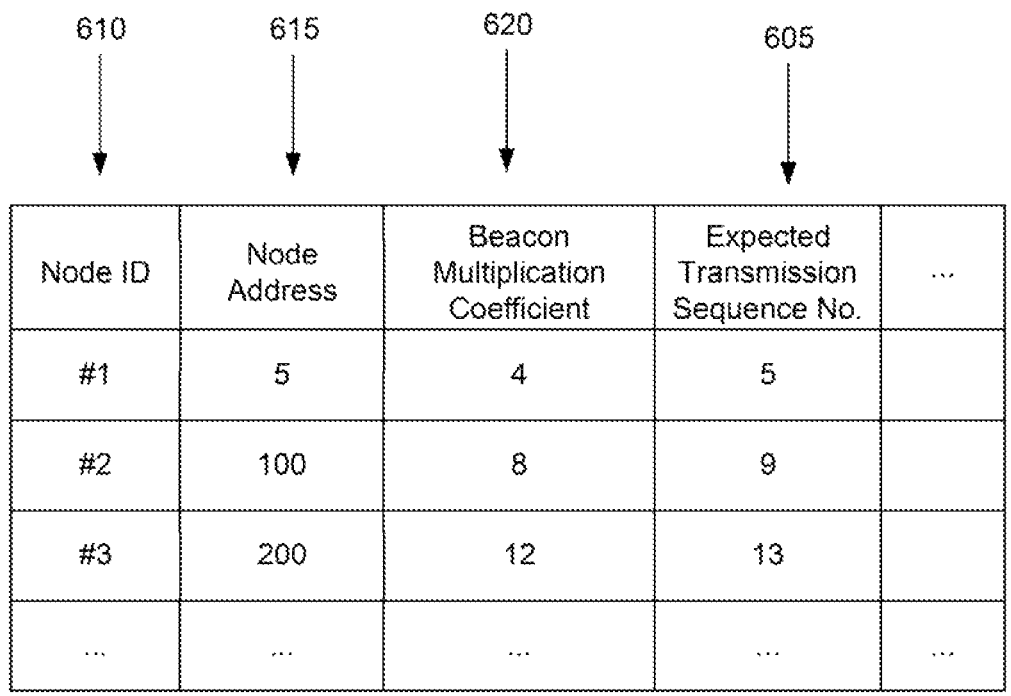
FIG. 6 is a table of beacon transmission timing data according to a particular embodiment of the present invention.

The coordinator device 105 may represent and/or store the sleeping interval data in a variety of forms. FIG. 6 is an example of sleeping interval data that is stored at the coordinator device 105. In this example, the sleeping interval data is represented in the form of an expected transmission sequence number 605, which is described in further detail below and helps indicate the next beacon frame that the sensor device 110*a* can receive after it "awakens" from a charging period and/or sleeping interval. For the sake of clarity, the illustrated data is arranged in the form of a table 600, but it should be appreciated that the data may be arranged in any suitable format or data structure.

The table data 600 is arranged in multiple entries e.g., each row in the figure. Each entry is associated with a particular sensor device (e.g., each one of sensor devices 110*a*-110*f*), which is identified by a unique node ID 610. Each entry also includes an address 615 for the corresponding sensor device, so that its location on a network 115 can be easily determined Each entry further includes a Beacon Multiplication Coefficient (BMC) 620. For the first entry in this example, the BMC was received from the sensor device 110*a* in step 215. In other embodiments, the coordinator device 105 does not receive the BMC from the sensor device 110*a* and instead calculates the BMC based on the charging interval or other data received from the associated sensor device in step 215.

Each entry further includes an expected transmission sequence number 605 for the associated sensor device. In various embodiments, each transmitted beacon frame includes a sequence number, which is incremented every time another beacon frame is transmitted. The sequence number in the table 600 refers to the next beacon frame that the corresponding sensor device will be in a position to receive and process i.e., such that the sensor device is able to obtain and respond to a command, request or other sensor device data stored in the beacon frame. In step 220 of FIG. 2, the coordinator device 105 determines the expected transmission sequence number 605 in the table based on the sequence number of the most recently transmitted beacon frame and the charging interval data received from the sensor device. In other embodiments, the sensor device 110*a* determines the sequence number 605 based on its associated charging interval data (e.g., in step 210) and then transmits it to the coordinator device 105 in step 215 for storage in the table 600.

One example implementation may be described as follows. Assume that the most recently transmitted beacon frame had a sequence number of 1 (e.g., beacon frame 510*a* of FIG. 5B). At a time before the next beacon frame 510*b* arrives at the sensor device 110*a*, the sensor device 110*a* goes into a charging mode (e.g., at time slot 530 of FIG. 5B). The BMC for this particular sensor device is 4. Since in this example the beacon frame sequence numbers are incremented by one at the transmission of each beacon frame, the sensor device will emerge from the charging mode by beacon frame no. 1+4=5 (e.g., beacon frame 510*e* of FIG. 5B, or four successive beacon frames after the first beacon frame 510*a*.) Thus, the coordinator device stores the aforementioned sequence number (i.e., 5) in the first row of the table 600, in addition to the aforementioned value for the BMC, the ID and address for the sensor device 110*a*.

In the illustrated embodiment, the table 600 includes multiple entries, each entry referring to a different sensor device 110*a*-110*f*. Because each sensor device may be in a different environment and charging at different rates, their respective BMC and sequence numbers may differ. The table 600 thus helps the coordinator device 105 determine the timing with which the coordinator device 105 should transmit beacon frames to different sensor devices. Put another way, when the coordinator device 105 has sensor device data intended for a particular sensor device, the table helps indicate when a beacon frame with that data should be transmitted.

It should be appreciated that any of the values illustrated in the table 600 may be determined by the sensor device 110a-110f and/or the coordinator device 105. In some embodiments, for example, each sensor device determines its corresponding BMC and the sequence number based on the charging interval data and transmits these values in step 215 to the coordinator device 105. In this approach, the sleeping interval data (e.g., the sequence number 605) is supplied to the coordinator device 105 by the sensor devices. In other embodiments, the coordinator device 105 receives the charging interval data but not the sequence number from each sensor device (e.g, in step 215). The coordinator device 105a then determines the sequence number based on the received charging interval data for each sensor device and stores the corresponding number in the table 600 for each connected sensor device.

Referring again to FIG. 2, once the coordinator device 105 determines the sleeping interval for a sensor device 110a and/or stores the sleeping interval data (e.g., as shown in table 600 of FIG. 6), the coordinator device 105 then transmits a beacon frame to the sensor device 110a (step 225). In this step, the beacon frame includes sensor device data i.e., data or commands intended for the sensor device 110a, and not necessarily for any other sensor devices 110b-110f. The timing of the transmission of this beacon frame is based on the timing determined in step 220 e.g., the sequence number 605 in the table 600 of FIG. 6.

The determination of transmission timing can be described using the example illustrated in FIG. 5B. In this example implementation, the coordinator device 105 has transmitted the first beacon frame 510a and in response, the sensor device 110a has transmitted data to the coordinator device 105 at time slot 530 (e.g., as described in steps 205, 210 and 215). Shortly thereafter, the sensor device 110a goes into a charging state (e.g., after time slot 530) and is not fully operational. In the meantime, the coordinator device 105 transmits three beacon frames 510b-510d. However, based on the data in table 600 and charging interval data received from the sensor device 110a, the coordinator device 105 is arranged not to insert data designated for the sensor device 110a in any of those frames 510b-510d, although it may insert data designated for other sensor devices in those frames (e.g., based on the data in table 600 of FIG. 6.) The coordinator device 105 inserts data designated for the sensor device 110a in the fifth beacon frame 510, since it has determined (e.g., based on the BMC and sequence number 605 in the first row of table 600) that the sensor device 110a will be in an operational mode when it receives the fifth beacon frame 510 and thus can execute any commands in the inserted sensor device data.

The sensor device 110a then receives the beacon frame with the sensor device data from the coordinator device. In this example, the sensor device data in the frame includes a request for sensor data from the sensor device 110a. The sensor data includes any conditions or characteristics sensed by the sensor device 110a in the environment around the sensor device 110a (e.g., temperature, pressure, light intensity, the times that any of these conditions took place, etc.)

In addition to or instead of the sensor data, any suitable data may be requested in the beacon frame. In response, the sensor device determines when to transmit sensor data to the coordinator device 105 (step 230).

The sensor device 110a may determine the timing of its transmission in any suitable manner. In the illustrated embodiment, for example, the sensor device data in the beacon frame further indicates a time slot (e.g., time slot 530) during which the sensor device 110a may transmit the sensor data without conflicting with the transmissions of other devices in the sensor system 100. Such approaches may be suitable for networks that use a protocol based on the IEEE 802.15.4 standard, although transmission timing may be determined using other techniques as well.

Afterward, the sensor device 110a transmits the sensor data to the coordinator device 105 (step 235). The timing of the transmission is based on the determination made in step 230. Before, during and/or after step 235, the sensor device 110a optionally may also perform one or more other operations based on the sensor device data in the beacon frame (step 240).

The sensor device data in the beacon frame may request a wide variety of operations to be performed by the sensor device 110a, depending on the needs of a particular application. As previously noted, the coordinator device 105 may request that data is transmitted to the coordinator device 105. Examples of requested data include but is not limited to sensor data/findings, diagnostic data, data indicating the status or state of the sensor device 110a, etc. If the sensor device 110a is part of or connected with a system, the coordinator device 105 may request that the sensor device 110a cause the system to perform particular operations. In one example, the sensor device 110a is connected with a refrigeration unit, whose temperature the sensor device 110a periodically monitors. Thus, the sensor device data received from the coordinator device 105 may request that the temperature of the refrigeration unit be decreased a particular amount. In response to the sensor device data in the beacon frame, the sensor device 110a then transmits a command to a suitable module in the refrigeration unit to lower the temperature as requested.

Generally, the method 200 of FIG. 2 and/or any of the steps of the method 200 are repeated over time. In various embodiments, for example, the sensor system 100 updates itself in response to changes in the ambient environment. That is, conditions in the ambient environment (e.g., sunlight, pressure, vibration, strength of RF signals, etc.) may change, which causes the charging interval of one or more of the sensor devices to change. By repeating steps 205-215, each sensor device 110a-110f periodically redetermines its charging interval and informs the coordinator device 105 of any changes. Additionally, steps 220-240 are also repeated, which causes the coordinator device 105 to adjust the timing of the transmissions of beacon frames and sensor device data based on the updated information received from the sensor device(s). In some designs, the timing of transmissions is adjusted only if the coordinator device and/or sensor device have determined (e.g., step 205, 220) that the change in the charging interval or sleeping interval is sufficiently large and/or exceeds a predetermined threshold.

Consider an example in which the sensor device 110a determines it has a BMC of 4. The sensor device 110a then determines that the charging interval has in fact changed, but not so much that the BMC has changed (e.g., according to the formula described in connection with step 220). In some implementations, the transmission timing is also not changed unless the charging interval change is great enough such that the BMC changes from its most recently calculated value (e.g., to 5 or 3.) Thus, in various embodiments the sensor system is self-regulating and/or automatically adjusts its communications based on the ease with which energy can be harvested from the ambient environment.

Some of the example approaches in connection with method 200 of FIG. 2 involve a Base Beacon Interval (BBI). It should be noted that the length of the BBI may be determined in a variety of ways, depending on the needs of a particular application. In some embodiments, for example, the BBI is predefined and/or fixed e.g., based on the communications protocol or data stored at the coordinator device 105. In still other embodiments, the BBI is dynamically determined. By way of example, each sensor device in the network 115 may transmit charging interval data (e.g., as discussed above in connection with steps 205, 210 and 215) to the coordinator device 105 and the coordinator device 105 may determine the BBI for the network based on the charging interval data received from all the sensor devices. In some implementations, the BBI is based on the charging interval data received from the sensor device with the lowest charging interval relative to the other sensor devices.

Figure 3:
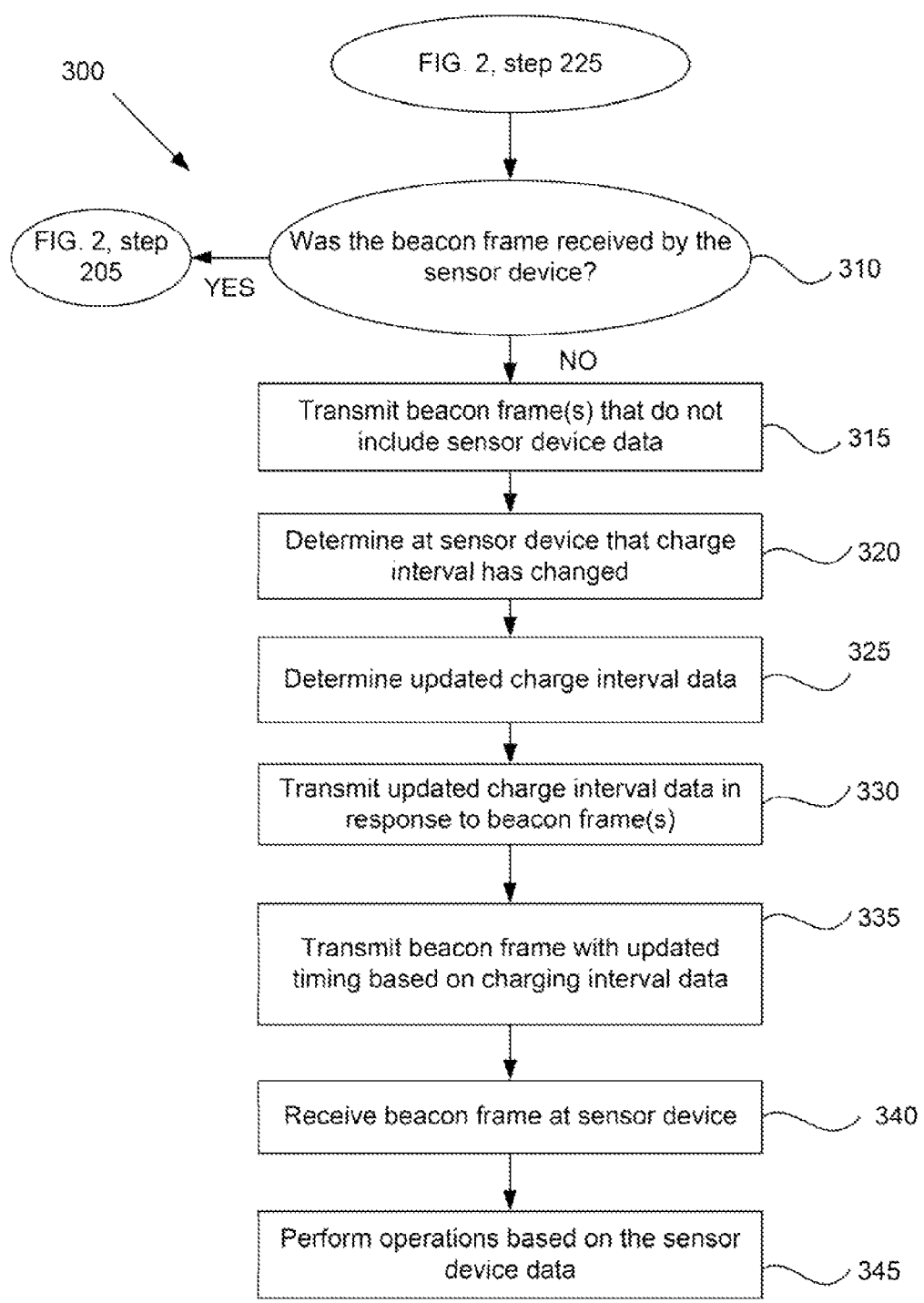
FIG. 3 is a flow chart illustrating an example method for updating sensor communications according to a particular embodiment of the present invention.

Referring next to FIG. 3, an example method 300 for updating the timing for beacon frame transmission will be described. From time to time, the charging intervals for a particular sensor device may change. By way of example, ambient conditions may change such that the sensor device finds it more difficult to harvest energy. Thus, the charging interval may lengthen. If the charging interval increases sufficiently, beacon frames with data designated for the sensor device which otherwise would have been safely received and processed by the sensor device may be missed, since the sensor device is still "asleep" and/or charging. Method 300 describes one process for adjusting the timing at which such beacon frames are transmitted based on the changes in the charging interval.

Method 300 begins at step 225 of method 200 of FIG. 2. That is, a sensor device 110a has determined its charging interval (step 205 of FIG. 2) and has transmitted charging interval data to the coordinator device 105 (step 215). Based on the charging interval data, the coordinator device 105 determines a sleeping interval for the sensor device (step 220) and transmits a beacon frame with sensor device data to the sensor device (step 225). (In some embodiments, the sensor device 110a determines the sleeping interval, which is received by the coordinator device 105 and used to determine the timing of the beacon frame transmission.) Step 225 may have been repeated one or more times.

At step 310 of FIG. 3, the coordinator device 105 makes a determination as to whether the beacon frame sent in step 225 was received by the sensor device 110a. This determination may be made in a variety of ways, depending on the communications protocol that is used. In some implementations, for example, the coordinator device 105 expects to receive a reply or acknowledgement from the sensor device 110a, indicating that the beacon frame was received and that and that any commands or requests in the sensor device data were executed successfully. If the acknowledgement is not received within a predefined time period, the coordinator device 105 determines that the sensor device 105 failed to receive the beacon frame, is still charging and/or is incapable of receiving and processing beacon frames.

If the coordinator device 105 determines that the sensor device successfully received the transmitted beacon frame, then the method 300 proceeds to step 230 of method 200. That is, method 200 proceeds in the usual manner. In various embodiments, this means that the sensor device 110a performs operations requested by the coordinator device 105 (e.g., steps 235 240) and continues to monitor its charging interval and inform the coordinator device of any changes (e.g., steps 205-215). The coordinator device 105 continues to transmit beacon frames (e.g., step 225) and repeats step 310 as appropriate.

If the coordinator device 105 determines that the sensor device 110a did not successfully receive the transmitted beacon frame, then the method 300 proceeds to step 315. The coordinator device 105 continues to send beacon frames (e.g., at every BBI), but does not transmit any beacon frames with sensor device data i.e., data designated for the sensor device 110a. This is because it is now unclear which frames the sensor device 110a is capable of receiving. In various embodiments, the coordinator device 105 does not send beacon frames with data specifically designated for the sensor device 110a (e.g., step 335) until it receives updated charging interval data from sensor device 110a (e.g., as described in step 330 below.)

In this example, it is assumed that the reason that the sensor device did not receive the last beacon frame is because its charging interval has changed or increased. At step 320, the sensor device 110a determines that its charging interval has changed. At step 325, based on the detected changes the sensor device 110a determines updated charging interval data (e.g., a new Beacon Multiplication Coefficient, a new expected transmission sequence number, etc.) Afterward, the sensor device 110a transmits the updated charging interval data to the coordinator device 105 (step 330). In response, the coordinator device 105 redetermines the timing for transmitting a beacon frame with sensor device data to the sensor device 110a. Based on the updated charging interval data, the coordinator device 105 may update any stored information (e.g., any of the information in table 600 of FIG. 6) relating to the sensor device 110a and the timing of beacon frame transmissions.

The coordinator device 105 then transmits a beacon frame with sensor device data i.e., data specifically designated for the sensor device 110a (step 335). The timing of the transmission takes into account the new charging interval of the sensor device 110a. Thus, the beacon frame arrives after the sensor device 110a has "awoken" from its possibly longer charging state and is in a position to receive and process the data in the beacon frame. The sensor device receives the beacon frame (step 340). Based on the sensor device data in the beacon frame, the sensor device 110a transmits data back to the coordinator device in response and/or performs one or more requested operations. Steps 320, 325, 330, 335, 340 and 345 may include any of the features or operations described in steps 205, 210, 215, 220, 225, 230, 235 and 240 of FIG. 2.

The above methods 200 and 300 may be performed in a modified version of the IEEE 802.15.4 standard. Accordingly, any known feature of beacon frames, network communications or other aspects of the IEEE 802.15.4 standard may be incorporated into the methods 200 and 300. By way of example, FIGS. 5A and 5B describe specific examples involving beacon frames. In FIGS. 5A and 5B, the active parts are shown. Various implementations may also include non-active parts, which are described in the IEEE 802.15.4 standard. That is, each beacon frame or BBI in FIG. 5B may also include an active part and a non-active part, as illustrated in FIG. 5C. However, it should be noted that the methods and features described herein are not limited to the IEEE 802.15.4 standard, and may be applied to a wide variety of different standards, platforms and networking protocols.

Figure 10:
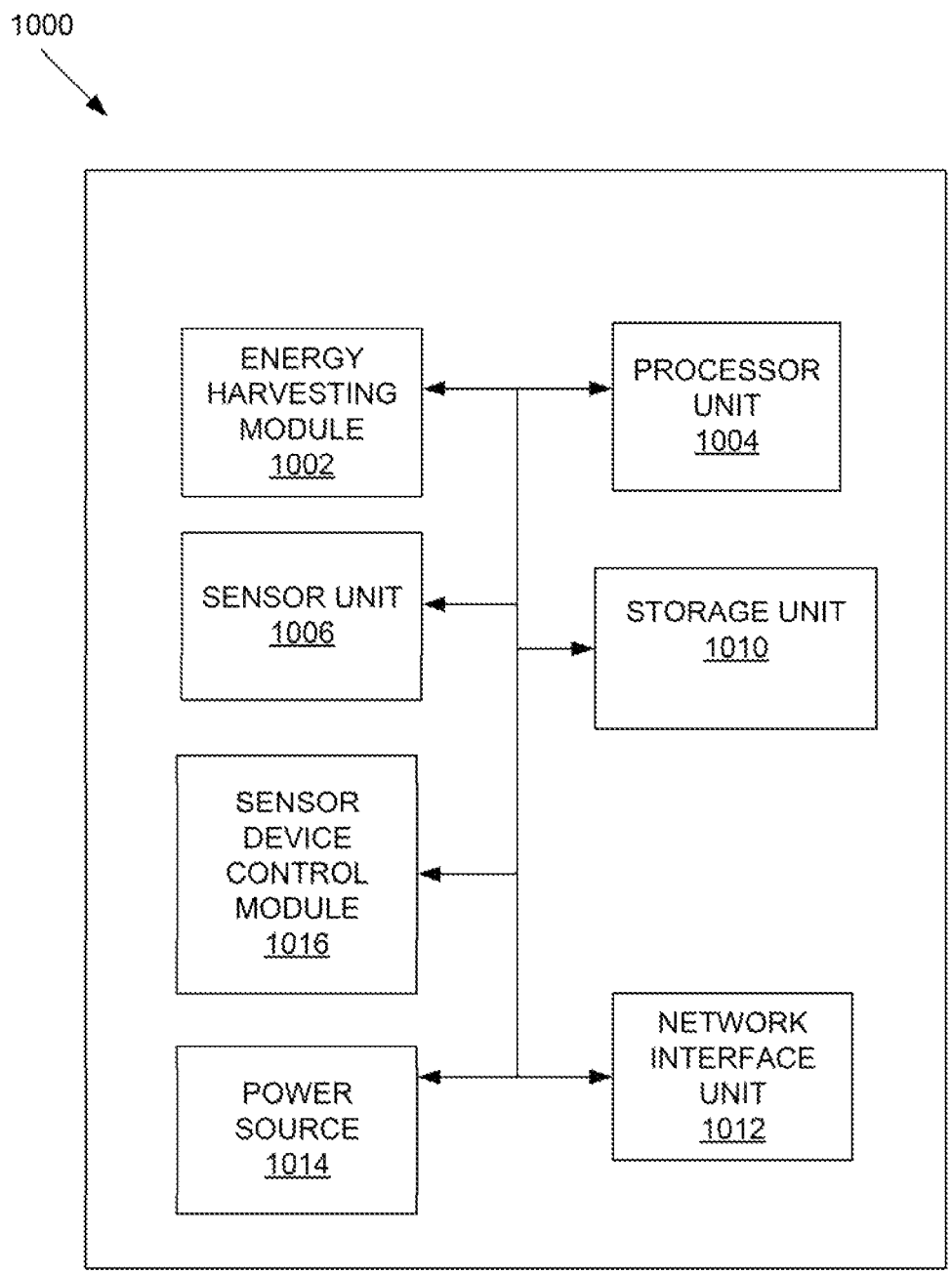
FIG. 10 is a block diagram of a sensor device according to a particular embodiment of the present invention.

Referring next to FIG. 10, a sensor device 1000 (e.g., any of sensor devices 110a-110f of FIG. 1) according to a particular embodiment of the present invention will be described. The sensor device 1000 includes a processor unit 1004 that includes one or more processors, a storage unit 1010, an energy harvesting module 1002, a power source 1014, a sensor unit 1006, a sensor device control module 1016 and a network interface unit 1012. The sensor device 1000 may be any suitable computing device used to sense or monitor one or more conditions in the ambient environment.

The energy harvesting module 1002 is any hardware, mechanism or hardware used to collect energy from the ambient environment, which is used to charge a power source 1014. Any suitable type of source or condition in the ambient environment may be used to generate power. In some embodiments, for example, the energy harvesting control module includes a mechanism for converting solar energy, pressure, vibration and/or heat into energy. In still other embodiments, the energy harvesting control module is arranged to receive radio frequency signals (e.g., from a WiFi access point) and convert them into energy.

The sensor unit 1006 is any hardware or software used to sense a condition or characteristic of the ambient environment. A wide variety of parameters or conditions may be sensed by the sensor unit. In some implementations, for example, the sensor unit 1006 is arranged to measure or sense sound, vibration, electrical characteristics (e.g., voltage and current), temperature, displacement, magnetic fields, pressure, biological/medical indicators (e.g., heart rate, hormone levels, glucose level, oxygen levels, etc.), humidity and the presence of particular gases, particulates, chemicals or substances. In still other embodiments, the sensor unit 1006 is arranged to monitor developments or conditions such as crowding, traffic, movement of people or things, and/or the appearance of particular faces, patterns or images. It should be appreciated that the sensor unit 1006 may be arranged to sense or detect a wide variety of different conditions or characteristics and is not limited to the examples cited above. Data based on the findings of the sensor unit 1006 may be transmitted to a coordinator device 105 using the network interface unit 1012 (e.g., step 235 of FIG. 2.)

The power source 1014 includes any suitable hardware or software used to store energy. The stored energy is used to power other components and operations of the sensor device 1000. Any suitable energy storing mechanism may be used. In some embodiments, for example, the power source is a capacitor or a battery. Generally, the power source 1014 is arranged to be charged by energy collected by the energy harvesting module 1002.

The network interface unit 1012 includes any hardware or software suitable for enabling the device 1000 to communicate with other devices in a network 115. In some embodiments, the network interface unit 1012 is arranged to transmit sensor data and other types of data to a coordinator device 105 (e.g., step 235 of FIG. 2.) The network interface unit 1012 is also arranged to receive sensor device data, commands and requests from the coordinator device 105 and any other device in the network 115 (e.g., step 225 of FIG. 2.) The network interface unit 1012 is arranged to transmit data and receive data using any suitable network (e.g., LAN, Internet, etc.) or communications protocol (e.g., Bluetooth, WiFi, NFC, IEEE 802.15.4, IEEE 802.11, etc.)

The storage unit 1010 is any hardware or suitable for storing data or executable computer code. The storage unit 1010 can include but is not limited to a hard drive, flash drive, non-volatile memory, volatile memory or any other type of computer readable storage medium. Any operation or method for a sensor device (e.g., sensor device 110a) that is described in this application (e.g., steps 205-240 of FIG. 2 and steps 320-345 of FIG. 3) may be stored in the form of executable computer code or instructions in the storage unit 1010. The execution of the computer code or instructions by the processor unit 1004 causes the device 1000 to perform any of the aforementioned operations or methods.

The sensor device control module 1016 is any hardware or software arranged to perform any of the operations or methods (e.g., steps 205-240 of FIG. 2) described in this application that pertain to the sensor device 1000. In various embodiments, the sensor device control module 1016 is arranged to cause the sensor device 1000 to determine a charging interval, transmit charging interval data and/or respond to requests from the coordinator device (e.g., steps 205, 210, 220, 230, 235 and 240 of FIG. 2.)

The sensor device 1000 may include a variety of additional components or control system not illustrated in the figure. In some embodiments, for example, the sensor device 1000 includes, is connected with or is part of a system e.g., a refrigeration unit, a manufacturing control system, an industrial control system, a computer, an inventory system, a financial system, etc. Thus, as previously discussed in connection with step 240 of FIG. 2, a coordinator device 105 may transmit a request to the sensor device 1000 indicating that the sensor device 1000 should cause the system to perform a particular operation. In one example, the coordinator device 105 receives sensor data (e.g., step 235) indicating that temperature in part of a grocery store has dropped to unacceptable levels. In another example, the sensor data indicates that an unauthorized intruder has entered a facility. In still another example, the sensor data indicates that the inventory for a product in a store has dropped below a particular level. In response, the sensor device 1000, based on a request sent from the coordinator device 105, adjusts the temperature, triggers an alert, or sends a request to restock the product, respectively.

Figure 11:
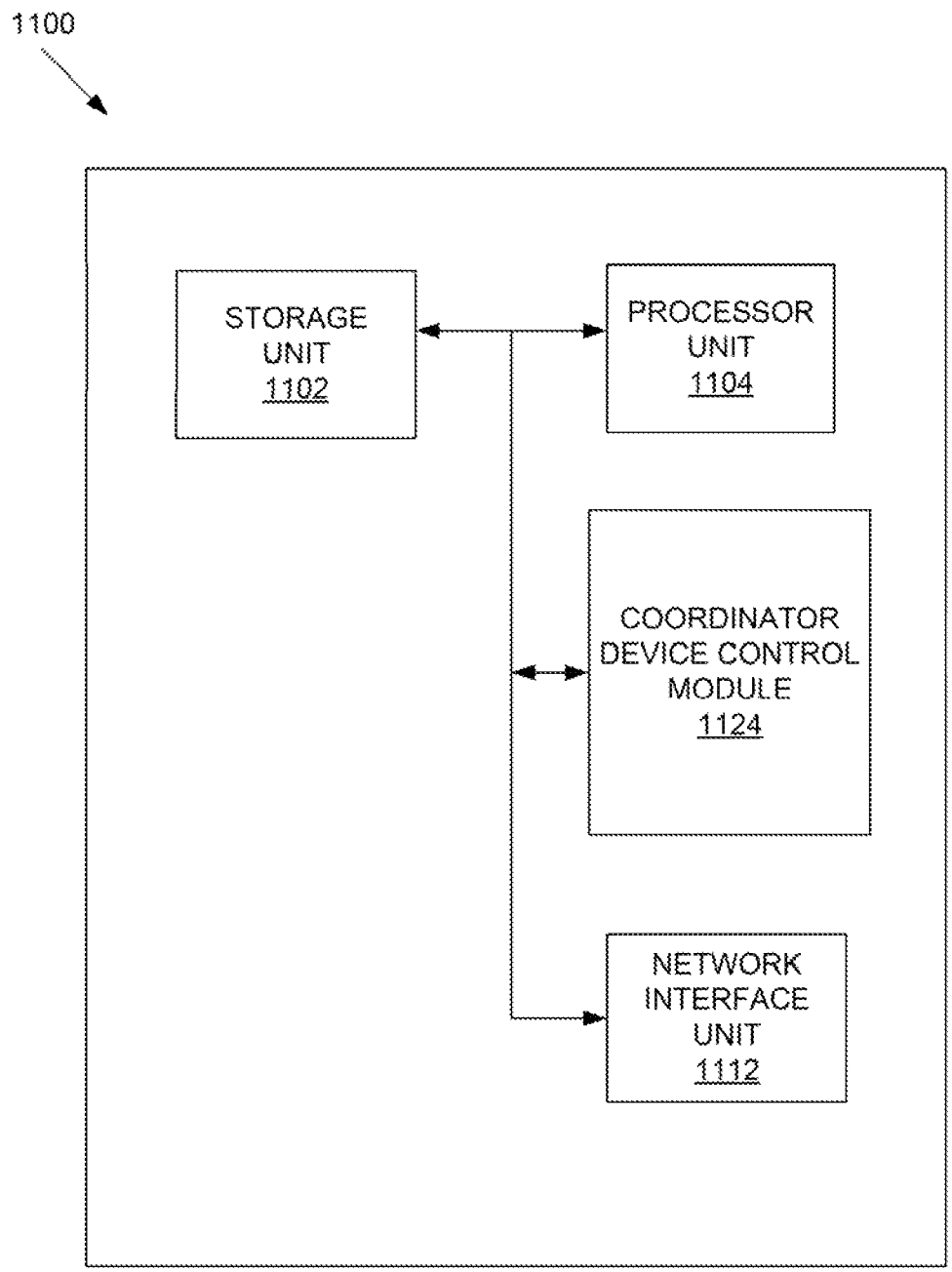
FIG. 11 is a block diagram of a coordinator device according to a particular embodiment of the present invention.

Referring next to FIG. 11, a coordinator device 1100 (e.g., coordinator device 105 of FIG. 1) according to a particular embodiment of the present invention will be described. The coordinator device 1100 includes a processor unit 1104 that includes one or more processors, a storage unit 1102, a coordinator device control module 1124 and a network interface unit 1112. The coordinator device 1100 may be any suitable computing device that is arranged to help synchronize communications for multiple sensor devices in a network.

The network interface unit 1112 includes any hardware or software suitable for enabling the coordinator device 1100 to communicate with any sensor devices or other devices on the network 115. In some embodiments, the network interface unit 1112 is arranged to transmit beacon frames, sensor device data and/or commands or requests to the sensor devices (e.g., step 225 of FIG. 2.) The coordinator device 1100 is also arranged to receive sensor data or other requested data from the sensor devices using the network interface unit 1112 (e.g., step 235 of FIG. 2.) In various embodiments, the network interface unit 1112 is used to send data (e.g., sensor data) to an external device upon request. The network interface unit 1112 is arranged to transmit data and receive data using any suitable network (e.g., LAN, Internet, etc.) or communications protocol (e.g., Bluetooth, WiFi, NFC, IEEE 802.15.4, IEEE 802.11, etc.)

The storage unit 1102 is any hardware or suitable for storing data or executable computer code. The storage unit 1102 can include but is not limited to a hard drive, flash drive, non-volatile memory, volatile memory or any other type of computer readable storage medium. Any operation or method for a coordinator device (e.g., coordinator device 105) that is described in this application (e.g., steps 215-240 of FIG. 2 and steps 310-315 of FIG. 3) may be stored in the form of executable computer code or instructions in the storage unit 1102. The execution of the computer code or instructions by the processor unit 1104 causes the device 1100 to perform any of the aforementioned operations or methods.

The coordinator device control module 1124 is any hardware or software arranged to perform any of the operations or methods (e.g., steps 215-235 of FIG. 2) described in this application that pertain to the sensor device 1100. In various embodiments, the coordinator device control module 1124 is arranged to cause the coordinator device to receive charging interval data from a sensor device, determine a sleeping interval and/or transmit a beacon frame and sensor device data (e.g., steps 210, 215, 220 and 225 of FIG. 2.)

Any of the methods or operations described herein can be stored in a tangible computer readable medium in the form of executable software code. The code can then be executed by one or more processors. The execution of the code causes a corresponding device (e.g., sensor device 110a-110f/1000, coordinator device 105/1100, etc.) to perform the described operations.

Although only a few embodiments of the invention have been described in detail, it should be appreciated that the invention may be implemented in many other forms without departing from the spirit or scope of the invention. For example, the present application and figures describe various methods (e.g., methods 200 and 300 of FIGS. 2-3) that perform particular operations. It should be appreciated that in some embodiments, one or more of these operations/steps may be modified, reordered and/or deleted. Additionally, some figures, such as FIGS. 1, 10 and 11, describe devices that contain various components. It should be noted that in some embodiments, one or more of these components may be merged together. In still other embodiments, one or more components may be separated into a greater number of components. The features of one component may be transferred to another and/or modified as appropriate. Each device may have additional components beyond what is shown in the corresponding figure. Therefore, the present embodiments should be considered illustrative and not restrictive and the invention is not to be limited to the details given herein.

What is claimed is:

1. A method for managing communications in a sensor network, the method comprising:

receiving charging interval data from an energy-harvesting sensor device for the energy-harvesting sensor device at a coordinator device;

determining a sleeping interval of the energy-harvesting sensor device based on the charging interval data;

transmitting a beacon frame from the coordinator device to the energy-harvesting sensor device, the beacon frame including sensor device data used by the energy-harvesting sensor device, wherein the timing of the transmission of the beacon frame is based on the sleeping interval;

detecting, at the coordinator device, that the energy-harvesting sensor device has not received the beacon frame with the sensor device data;

transmitting upon said detecting, from the coordinator device to the energy-harvesting sensor device, a beacon frame that does not include sensor device data;

receiving, at the coordinator device, in response to the beacon frame without sensor device data, updated charging interval data from the energy-harvesting sensor device indicating that a charging interval has changed; and transmitting from the coordinator device to the energy-harvesting sensor device a second beacon frame that includes the sensor device data, wherein the timing of the transmission of the second beacon frame is based on the updated charging interval data.

2. The method of claim 1 wherein:

the charging interval data is based on a period of time required by the energy-harvesting sensor device to charge a power source to a sufficient level such that the energy-harvesting sensor device is capable of performing one or more operations; and the sleeping interval is a period of time during which the energy-harvesting sensor device, due at least in part to a lack of power, is not in a position to receive and process the sensor device data.

3. The method of claim 1 wherein:

the timing of the transmission of the beacon frame is based on a base beacon multiplication coefficient;

the base beacon multiplication coefficient is an integer multiple of a base beacon interval; and the base beacon interval is a time interval between successive transmissions of a beacon frame from the coordinator device to the energy-harvesting sensor device.

4. The method of claim 3 wherein the base beacon interval is one of 1) predefined and 2) determined based at least in part on charging interval data received from one or more energy-harvesting sensor devices.

5. The method of claim 1 wherein the beacon frame includes one or more of 1) an indication of a time slot that the energy-harvesting sensor device can use to transmit data; and 2) a request for the energy-harvesting sensor device to perform an operation.

6. The method of claim 1 wherein the coordinator device is connected through a network with a plurality of sensor devices, the method further comprising:

storing data at the coordinator device, the stored data including a plurality of entries, each entry including identification data that is associated with and identifies a different one of the plurality of sensor devices and data indicating a time when the associated sensor device will have charged sufficiently to be in a position to receive and process sensor device data received from the coordinator device.

7. The method of claim 1 further comprising:

based on the detecting operation, determining, at the coordinator device, that the energy-harvesting sensor device is not fully charged and cannot receive and process the sensor device data.

8. The method of claim 1 further comprising:

receiving charging interval data from each of a plurality of sensor devices;

based on the charging interval data, storing timing data at the coordinator device wherein the timing data helps indicate when each of the plurality of sensor devices is not charging and is capable of receiving and processing commands from the coordinator device; and transmitting a plurality of beacon frames wherein each of the plurality of beacon frames includes data designated for a different one of the sensor devices and wherein the timing of the transmission of each of the plurality of beacon frames is different based on the timing data stored for the designated sensor device.

9. The method of claim 1 wherein the energy-harvesting sensor device is arranged to charge a power source using at least one of 1) light; 2) vibration; 3) pressure; 4) heat; and 5) radio frequency signals.

10. A non-transitory computer readable storage medium that includes executable computer code embodied in a tangible form wherein the computer readable medium includes executable computer code operable to perform the method of claim 1.

11. The method of claim 1 wherein the receiving operations and the transmitting operations are performed using a wireless network that connects the coordinator device with the energy-harvesting sensor device.

12. The method of claim 11 wherein the wireless network is radio frequency based and operates in an ISM frequency band selected from the group consisting of: 1) 800-900 MHz; 2) 2.4 GHz; 3) 5 GHz; and 4) 60 GHz.

13. The method of claim 11 wherein the receiving of the charging interval data involves receiving a MAC command frame in accordance with the IEEE 802.15.4 standard from the sensor device.

14. The method of claim 13 wherein:
at least one octet in the MAC command frame indicates a base beacon multiplication coefficient;
the base beacon multiplication coefficient is an integer multiple of a base beacon interval that helps indicate when the energy-harvesting sensor device has finished charging and is capable of receiving data from the coordinator device; and
the base beacon interval is a time interval between successive transmissions of a beacon frame from the coordinator device to the energy-harvesting sensor device.

15. A sensor device, comprising:
an energy harvesting module that is arranged to collect energy from the ambient environment;
a power source that is charged using the energy harvesting module;
a network interface unit that is arranged to connect the sensor device through a network with a coordinator device;
at least one processor;
at least one memory that stores computer readable instructions, which when executed by the at least one processor cause the sensor device to:
determine charging interval data at the sensor device;
transmit the charging interval data to the coordinator device using the network interface unit;
receive a beacon frame from the coordinator device wherein the beacon frame includes data to be used by the sensor device and is received at a time based on the transmitted charging interval data;
perform one or more operations based on the sensor device data in the beacon frame;
determine, at the sensor device, that a charging interval for the sensor device has changed;
receive, from the coordinator device, a beacon frame that does not include sensor device data;
based on the changed charging interval and in response to the beacon frame without sensor data, transmit updated charging interval data to the coordinator device; and
receive a second beacon frame that includes data to be used by the sensor device and that is received at a time based on the transmitted updated charging interval data.

16. The sensor device of claim 15 wherein the energy harvesting module includes at least one of 1) a solar panel; 2) a mechanism for converting vibration into energy that is used to charge the power source; 3) a mechanism for converting pressure into energy that is used to charge the power source; 4) a mechanism for converting heat into energy that is used to charge the power source; and 5) a mechanism for converting radio frequency signals into energy that is used to charge the power source.

17. A coordinator device, further comprising:
at least one processor;
a network interface unit that is arranged to connect the coordinator device through a network with an energy-harvesting sensor device; and
at least one memory that stores computer readable instructions, which when executed by the at least one processor cause the coordinator device to:
receive charging interval data from the energy-harvesting sensor device;
determine a sleeping interval of the energy-harvesting sensor device based on the charging interval data;
transmit a beacon frame to the energy-harvesting sensor device, the beacon frame including sensor device data used by the energy-harvesting sensor device;
detect that the energy-harvesting sensor device has not received the beacon frame with the sensor device data;
transmit to the energy-harvesting sensor device upon said detect, a beacon frame that does not include sensor device data;
receive, in response to the beacon frame without sensor device data, updated charging interval data from the energy-harvesting sensor device indicating that a charging interval has changed; and
transmit to the energy-harvesting sensor device a second beacon frame that includes the sensor device data, wherein the timing of the transmission of the second beacon frame is based on the updated charging interval data.

18. The coordinator device of claim 17 wherein:
timing of the transmission of the beacon frame is based on a base beacon multiplication coefficient;
the base beacon multiplication coefficient is an integer multiple of a base beacon interval; and
the base beacon interval is a time interval between successive transmissions of a beacon frame from the coordinator device to the energy-harvesting sensor device.

19. The coordinator device of claim 18 wherein the base beacon interval is one of 1) predefined and 2) determined based at least in part on the charging interval data received from one or more energy harvesting sensor devices.

20. The coordinator device of claim 17 wherein the beacon frame includes one or more of 1) an indication of a time slot that the energy-harvesting sensor device can use to transmit data; and 2) a command for the energy-harvesting sensor device to perform an operation.

21. The coordinator device of claim 17 wherein the computer readable instructions, when executed by the at least one processor, cause the coordinator device to: store data at the coordinator device, the stored data including a plurality of entries, each entry including identification data that is associated with and identifies a different one of the plurality of sensor devices and data indicating a time when the associated sensor device will have charged sufficiently to be in a position to receive and process sensor device data received from the coordinator device.

* * * * *